US009802527B2

(12) United States Patent
Oberhammer et al.

(10) Patent No.: US 9,802,527 B2
(45) Date of Patent: Oct. 31, 2017

(54) VEHICLE HEADLIGHT

(71) Applicant: Bluetechnix Group GmbH, Vienna (AT)

(72) Inventors: Roland Oberhammer, Vienna (AT); Robert Hranitzky, Bad Voslau (AT)

(73) Assignee: Bluetechnix Group GmbH, Vienna (AT)

( * ) Notice: Subject to any disclaimer, the term of this patent is extended or adjusted under 35 U.S.C. 154(b) by 175 days.

(21) Appl. No.: 14/889,668

(22) PCT Filed: May 6, 2014

(86) PCT No.: PCT/EP2014/059250
§ 371 (c)(1),
(2) Date: Nov. 6, 2015

(87) PCT Pub. No.: WO2014/180856
PCT Pub. Date: Nov. 13, 2014

(65) Prior Publication Data
US 2016/0082877 A1    Mar. 24, 2016

(30) Foreign Application Priority Data
May 6, 2013 (AT) .................................. A 376/2013

(51) Int. Cl.
*H04N 7/18* (2006.01)
*B60Q 1/00* (2006.01)
(Continued)

(52) U.S. Cl.
CPC ............. *B60Q 1/0023* (2013.01); *B60Q 1/04* (2013.01); *G01S 7/4815* (2013.01);
(Continued)

(58) Field of Classification Search
CPC ....... B60Q 1/0023; B60Q 1/04; G01S 17/936; G01S 7/4815; G01S 2013/9396; H04N 5/2253; H04N 5/2252
(Continued)

(56) References Cited

U.S. PATENT DOCUMENTS 7,474,798 B2 * 1/2009 Seger ........................ H04N 5/20
348/E5.047
8,446,470 B2 * 5/2013 Lu ........................ H04N 5/2258
348/148
(Continued)

FOREIGN PATENT DOCUMENTS

DE    102006025020 A1    11/2007
DE    102006044794 A1    3/2008
(Continued)

OTHER PUBLICATIONS

European Patent Office, "International Search Report", issued in connection to International Application No. PCT/EP2014/059250, dated Aug. 28, 2014, 6 pages.
(Continued)

*Primary Examiner* — Robert Chevalier
(74) *Attorney, Agent, or Firm* — McKee, Voorhees & Sease, PLC

(57) ABSTRACT

The invention relates to a vehicle headlight, comprising a housing (1) and modulatable light or IR radiation sources (4) which are arranged within the housing (1) and on a movable module support (5), and comprising an interface (2) for connection to an external vehicle processor (3), wherein an image sensor (6) for determining depth information from the backscatter radiation of the light or IR radiation sources (4) is arranged within the housing (1), and a processor (8) connected to the image sensor (6), which processor is connected via a modulator (9) to at least some of the modulatable light or IR radiation sources (4) arranged within
(Continued)

the housing (1). It is proposed in accordance with the invention that the processor (8) is connected via a bidirectional data link (10) to the interface (2), and the image sensor (6) is arranged on the module support (5) or on an image sensor support triggered jointly with the module support (5). An application of ToF technology in automotive engineering which is fit for day-to-day use and suitable for series production is achieved in this manner by the best possible integration in conventional automotive engineering.

5 Claims, 1 Drawing Sheet

(51) Int. Cl.
*G01S 17/93* (2006.01)
*G01S 7/481* (2006.01)
*B60Q 1/04* (2006.01)
*H04N 5/225* (2006.01)
*G01S 13/93* (2006.01)

(52) U.S. Cl.
CPC ......... *G01S 17/936* (2013.01); *H04N 5/2252* (2013.01); *H04N 5/2253* (2013.01); *G01S 2013/9396* (2013.01)

(58) Field of Classification Search
USPC .................................. 348/148, 143, 149, 164
See application file for complete search history.

(56) References Cited

U.S. PATENT DOCUMENTS

| | | | |
|---|---|---|---|
| 2008/0040004 A1* | 2/2008 | Breed | B60R 21/0134 701/45 |
| 2008/0158045 A1 | 7/2008 | Teranishi et al. | |
| 2008/0309914 A1 | 12/2008 | Cantin et al. | |
| 2010/0191418 A1 | 7/2010 | Mimeault et al. | |

FOREIGN PATENT DOCUMENTS

| | | |
|---|---|---|
| EP | 1323570 A1 | 2/2003 |
| JP | H0364838 U | 6/1991 |
| WO | 2008154736 A1 | 12/2008 |
| WO | 2014180856 A1 | 11/2014 |

OTHER PUBLICATIONS

Austrian Patent Office, "Search Report", issued in connection to Austrian Application No. A 376/2013, dated Feb. 26, 2014, 1 page.

* cited by examiner

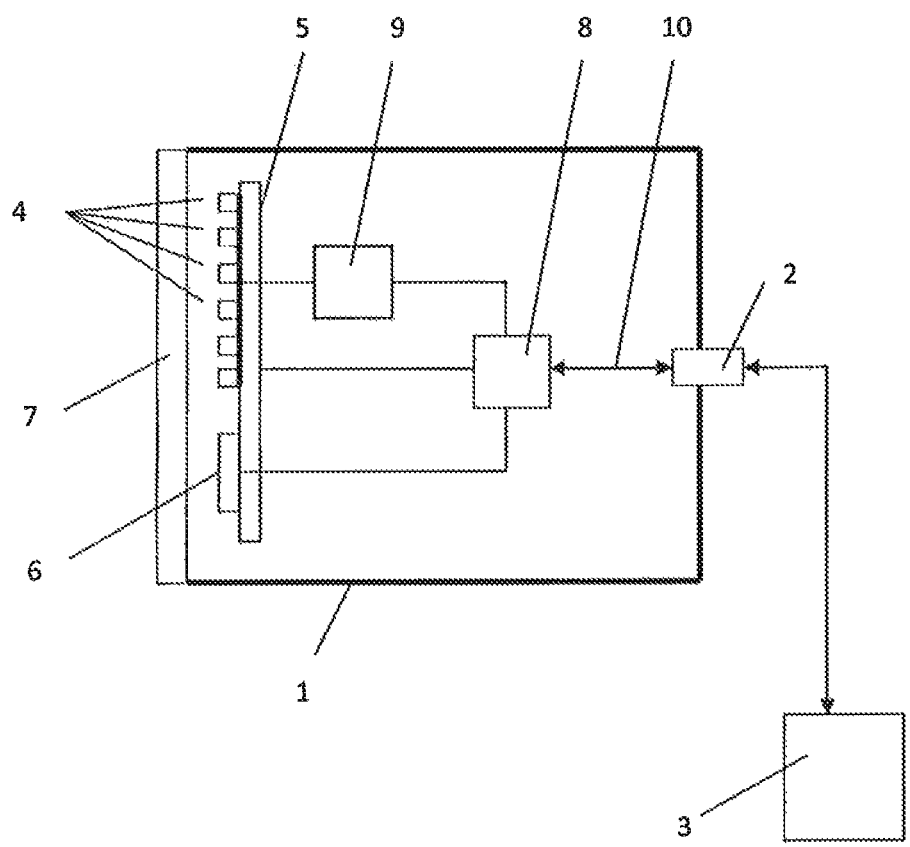

VEHICLE HEADLIGHT

CROSS-REFERENCE TO RELATED APPLICATIONS

This is a National Phase application of PCT/EP2014/059250 filed May 6, 2014, which claims priority to AT A376/2013 filed May 6, 2013, all of which are incorporated by reference herein in their entireties.

BACKGROUND OF THE INVENTION

The invention relates to a vehicle headlight, comprising a housing and modulatable light or IR radiation sources arranged within the housing, and comprising an interface for connection to an external vehicle processor, according to the preamble of claim 1.

All light or IR radiation sources radiating into the external region of a vehicle shall be understood as vehicle headlamps here and below, i.e. both front headlamps and rear lights which are used for illumination or signalling. Vehicle headlights are increasingly used for this purpose in which LEDs (light-emitting diodes) are arranged on module supports in the manner of a matrix as light or IR radiation sources. If the LEDs used in this case are additionally operated with AFL (adaptive forward lighting) technology, the illumination profile of the vehicle headlight can be varied, wherein the LED modules can be dimmed to a differently strong extent by means of a vehicle processor depending on the desired illumination profile. Changes in the illumination profile of the vehicle headlight during travel, i.e. during travel through curves, changing weather conditions or recognised objects at the edge of the road will also be referred to below as a dynamic illumination profiles. The desired illumination profile can be selected by means of respective sensors for example which determine information from the ambient environment of the vehicle and respectively control the vehicle headlights via the vehicle processor.

The LED module for the front headlamp for example mixes white light by a combination of several wavelengths. These wavelengths are generated partly indirectly by blue LEDs made of gallium nitride (GaN) and a converter layer, and partly directly by yellow LEDs made of aluminium indium gallium phosphide (AlInGaP). The LED modules for the rear lights or brake lights generate wavelengths around 700 nm by red LEDs made of semiconductors such as aluminium gallium arsenide (AlGaAs), gallium arsenide phosphide (GaAsP), aluminium gallium indium phosphide (AlGaInP) or gallium phosphide (GaP). The beam formation of the LED modules is usually supported by plastic lenses and mirror reflectors.

Furthermore, efforts were made to equip vehicles with so-called "time of flight" (ToF) cameras. The ToF cameras concern cameras which not only record a 2D image but also measure depth information for each recorded pixel. Depth information is understood as information on the distances between the individual objects of a scene and the ToF camera. ToF cameras are also known as active cameras since they are equipped with their own light source, which will also be referred to below as ToF light source. The light emitted by this light source is reflected on objects of a scene to be recorded and thus reaches the detection region of the image sensor of the camera as backscatter radiation. The depth information is determined from the reflected light via the runtime and phase difference measurements.

Possibilities for using the ToF technology in vehicles are described in US 2008039914 A1, WO 2008154736 A1, DE 102006025020 A1 and DE 102006044794 A1.

The light sources are usually LEDs which emit modulated light. The light is usually emitted by means of a ToF modulator in the megahertz range in an OOK (On-Off Keying) modulated manner (e.g. with 20 MHz), and is thus emitted into the field of vision of the own image sensor. The reflected light components (photons) are received by the camera sensor and used for calculating the distance of the reflected object. These depth data are subsequently available for applications in addition to the greyscale image. Infrared LEDs or laser diodes are used for illumination in most applications. PMD image sensors with 352×288 pixels (QVGA resolution) are currently usually used as image sensors. The image sensors must be supplied with the OOK signal according to the shutter principle, which signal is also used synchronously for triggering the ToF light source. The image sensor subsequently supplies an analog differential signal, from which the depth information per pixel can be calculated by using several sequential image recordings in the ToF camera processor. The power dissipation of conventional ToF cameras lies in the range of 10 W to 100 W and is relevantly determined by the power of the ToF light source and the triggering signal.

An application of ToF technology in automotive engineering which is fit for day-to-day use and suitable for series production has not yet been produced. On the one hand, there are technical difficulties because the light source required for the ToF camera causes a considerable additional need for more power for the power supply of the vehicle and a respective need for increased cabling. Furthermore, the image sensor and the light source of the ToF camera are arranged separately from each other in the vehicle for practical reasons, i.e. in that the light source is positioned in the region of the radiator grille in order to avoid dazzling oncoming vehicle drivers, and the image sensor in the region of the windscreen. This means additional cabling work for the ToF system itself because the high-frequency modulation signal cannot be transmitted via the existing vehicle interfaces to the ToF light source. The cabling and the transmission electronics are further subject to the stringent EMC regulations on vehicle electronics. Furthermore, the separate mounting position of the two parts further limits the purpose due to the low amount of overlapping of the fields of vision.

In addition to the aforementioned technical difficulties, there are further also practical problems such as those caused by the soiling of a ToF light source arranged in the region of the radiator grille, as well as logistical problems in the development, production and maintenance of the vehicle because several different vehicle regions (e.g. radiator grille and bonnet, passenger compartment and windscreen, tailgate or bumper) are affected and thus different divisions of the manufacturer are involved in the integration and approval of the respective components.

SUMMARY OF THE INVENTION

It is thus the object of the invention to overcome these difficulties and to enable an application of ToF technology in automotive engineering which is fit for day-to-day use and suitable for series production. In particular, an integration of the ToF technology in conventional automotive engineering shall be facilitated and its applicability shall also be achieved in dynamic illumination profiles of the vehicle headlights.

These objects are achieved by, in one aspect of the invention, a vehicle headlight, comprising a housing and modulatable light or IR radiation sources which are arranged within the housing and on a movable module support, and comprising an interface for connection to an external vehicle processor, wherein an image sensor for determining depth information from the backscatter radiation of the light or IR radiation sources is arranged within the housing, and a processor connected to the image sensor, which processor is connected via a modulator to at least some of the modulatable light or IR radiation sources arranged within the housing. It is proposed in accordance with the invention that the processor is connected via a bidirectional data link to the interface, and the image sensor is arranged on the module support or on an image sensor support triggered jointly with the module support.

The light or IR radiation sources of the vehicle headlight are thus used as light sources for determining depth information, in that the modulation capability of the light or IR radiation sources of known vehicle headlights on the basis of LEDs are used, even though the modulation is carried out conventionally at lower frequency. Yellow LEDs with wavelengths of the yellow light component of approximately 600 nm are especially suitable for the front headlights and flashing lights, and red LEDs with wavelengths of the red light component of approximately 650 nm for the rear lights and brake lights. It has been recognised however that as a result of the increasingly dynamically arranged illumination profile of the vehicle headlights the backscatter radiation and especially the direction of the maximum backscatter radiation also change. The vehicle driver responds to these changed illumination profiles by a respective movement of the head in order to look in the direction of the maximum backscatter radiation. A ToF image sensor arranged in the region of the windscreen for example would also have to follow these changes in directions in order to receive sufficient illumination strengths by the backscatter light and to determine depth information from objects in the respectively illuminated region.

That is why the arrangement of the image sensor is proposed in the housing of the vehicle headlight, and thus close to the light or IR radiation sources. The image sensor is always in the region of the maximum backscatter radiation close to the optical axis even in the case of changed illumination profiles of the vehicle headlight, which optical axis is defined by the straight connection of the vehicle headlight with the respectively illuminated object. The arrangement of the image sensor in the housing of the vehicle headlight further offers the advantage that it profits from the own cleaning systems for vehicle headlights which are currently increasingly available.

Furthermore, in another aspect of the invention, a separate processor is also provided in accordance with the invention, which processor assumes the function of a ToF camera processor, and is connected on the one hand to a modulator for the respective high-frequency modulation of the light or IR radiation sources of the vehicle headlight and on the other hand via a bidirectional data connection to the interface to the eternal vehicle electronics. The transmission path of the high-frequency modulation signal can thus be kept short on the one hand without impairing the remaining vehicle electronics, and open-loop and closed-loop control tasks for illumination and signaling can be assumed on the other hand by the external vehicle processor and can be adjusted to the requirements of the ToF depth information determination. The processor which is used as the ToF camera processor can thus exchange calculated data via the interface with the external vehicle processor, accept control information for changing the illumination profile from the external vehicle processed in real time, and change the illumination profile of the vehicle headlight by considering the requirements of the ToF image sensor in real time.

It is further proposed in accordance with another aspect of the invention that the image sensor is arranged on the module support or an image sensor support which is jointly controlled with the module support. As a result, the image sensor also performs pivoting movements of the module support and is thus always positioned perpendicularly to the optical axis. The time-of-flight camera processor is preferably connected to the module support and the image sensor support so that the ToF camera processor can also control their movements independently from the external vehicle processor.

BRIEF DESCRIPTION OF THE DRAWINGS

The invention will be explained below in closer detail by reference to an embodiment shown in the enclosed drawings. FIG. 1 shows a schematic illustration of a vehicle headlight in accordance with the invention.

DETAILED DESCRIPTION OF EXEMPLARY EMBODIMENTS OF THE INVENTION

FIG. 1 shows a vehicle headlight in accordance with the invention, comprising a housing 1 with an interface 2 for connection to an external vehicle processor 3. Modulatable light and IR radiation sources 4 are arranged in the manner of a matrix within the housing 1, e.g. on a movable module support 5. The light and IR radiation sources 4 are also provided with respective focusing optics. An image sensor 6 for determining depth information from the backscatter radiation of the light and IR radiation sources 4 is further provided within the housing 1, as is also used in conventional time-of-flight cameras, wherein the image sensor 6 is arranged in the illustrated embodiment on the module support 5, so that during movements of the module support 5 both the light and IR radiation sources 4 and also the image sensor 6 are moved. The image sensor 6 is usually also provided with separate focusing optics. The relative arrangement of the image sensor 6 and the light and IR radiation sources 4 will vary depending on the configuration of the vehicle headlight. The vehicle headlight is further sealed on the emission side with an optional protective cover 7, which is transparent in both directions of passage for the passing light. The arrangement of the image sensor 6 within the housing 1 in accordance with the invention also offers the advantage that the transmission behaviour of the protective cover 7 in relation to light of different frequencies is not only known to the manufacturer of the headlight, but can also be respectively optimised, especially concerning the image sensor 6. Notice must be taken that windscreens are increasingly equipped with optical properties, e.g. with tinting and the like, which can have a disadvantageous influence on the transmission behaviour for the light concerning the image sensor 6 and can hardly be influenced by the manufacturer of the headlight. Furthermore, the image sensor 6 profits from optional cleaning systems for the protective cover 7. The protective cover 7 can advantageously be formed in such a way that it reduces scattered light from the light and IR radiation sources 4 to the image sensor 6 in order to minimise dazzling of the image sensor 6.

The image sensor 6 is further connected to a processor 8 which fulfils the function of a time-of-flight camera processor and is connected via a modulator 9 to at least some of the modulatable light and IR radiation sources 4 arranged within the housing 1. Since comparatively high modulation frequencies in the MHz range are required for gaining depth information via the image sensor 6, it is advantageous to use merely some of the modulatable light and IR radiation sources 4 as ToF light sources in order to reduce the generation of heat on the one hand and to enable different brightness settings for example on the other hand with the remaining part of the modulatable light and IR radiation sources 4 by modulation in the conventional kHz range. The modulator 9 is formed in FIG. 1 as a unit which can carry out modulations in different frequency ranges and is thus suitable for triggering all light and IR radiation sources 4, irrespective of whether they are used for illumination and signalling or for gaining depth information.

The processor 8 is also connected in the illustrated embodiment with the module support 5 in order to trigger the module support 5. The image sensor 6 could also be arranged on a separate image sensor support, which in this case would also be connected to the processor 8 in order to synchronously trigger the module support 5 and the image sensor support. The processor 8 is further connected via a bidirectional data connection 10 to the interface 2 in order to exchange data and control commands with the external vehicle processor 3. From a functional standpoint, the processor 8, the image sensor 6, the modulator 9 and the part of the inodulatable light and IR radiation sources 4 which is modulated for gaining depth information with comparatively high modulation frequencies in the MHz range, form a ToF camera, even though the functional separation for triggering the modulatable light and IR radiation sources 4 for illumination and signaling can hardly be carried out anymore. The vehicle headlight in accordance with the invention can thus not be distinguished from a conventional vehicle headlight concerning its basic functionality of illumination and signaling, but offers the additional function of 3D depth calculation in each pixel of the ToF image sensor 6 and applications that can be derived therefrom. Furthermore, the vehicle headlight in accordance with the invention additionally provides the programmable power of the processor 8 which can assume tasks for controlling the illumination or signaling, and for event monitoring in the ambient environment of the vehicle by the external vehicle processor 3. The vehicle headlight in accordance with the invention can thus assume tasks such as the calculation of the distance of objects in the field of vision of the vehicle headlight, the tracking of objects and persons in the field of vision of the vehicle headlight by calculating their motion paths, the calculation of collision probabilities with objects and persons by extrapolation of their movement vectors, the calculation of illumination profiles such as adaptive cornering light, static bending light or fog light for supporting driving operations, the calculation of illumination profiles for marking endangered objects and persons by additional illumination thereof, or the calculation of illumination profiles for avoiding the dazzling of oncoming traffic by selective dimming when travelling with high beam.

From a practical standpoint, the vehicle headlight in accordance with the invention is within the responsibility of the producer of the headlight from a logistical standpoint. It is merely necessary to additionally control the interface 2 of the vehicle headlight to the external vehicle processor 3, wherein a bidirectional control and event interface, which is preferably capable of real-time processing, to the vehicle processor 3 is adequate. An application of ToF technology in automotive engineering which is fit for day-to-day use and suitable for series production is achieved in this manner by the best possible integration in conventional automotive engineering.

The invention claimed is:

1. A vehicle headlight, comprising: a housing (1) and modulatable light or IR radiation sources (4) which are arranged within the housing (1) and on a movable module support (5), and comprising an interface (2) for connection to an external vehicle processor (3), wherein an image sensor (6) for determining depth information from the backscatter radiation of the light or IR radiation sources (4) is arranged within the housing (1), and a. processor (8) connected to the image sensor (6), which processor is connected via a modulator (9) to at least some of the modulatable light or IR radiation sources (4) arranged within the housing (1), wherein the processor (8) is connected via a bidirectional data link (10) to the interface (2), and the image sensor (6) is arranged on the module support (5) or on an image sensor support triggered jointly with the module support (5).

2. A vehicle headlight according to claim 1, characterized in that the processor (8) is connected to the module support (5) and the image sensor support.

3. A vehicle with at least one vehicle headlight according to claim 1.

4. A vehicle with at least one vehicle headlight according to claim 2.

5. A vehicle headlight according to claim 1 comprising:
a front head lamp; or
a tail light.

* * * * *

UNITED STATES PATENT AND TRADEMARK OFFICE
CERTIFICATE OF CORRECTION

PATENT NO. : 9,802,527 B2
APPLICATION NO. : 14/889668
DATED : October 31, 2017
INVENTOR(S) : Roland Oberhammer and Robert Hranitzky Page 1 of 1

It is certified that error appears in the above-identified patent and that said Letters Patent is hereby corrected as shown below:

In the Claims

In Column 6, Claim 1, Line 30:
DELETE "." which occurs after the letter a

Signed and Sealed this
Thirteenth Day of February, 2018

Andrei Iancu
*Director of the United States Patent and Trademark Office*